US011363311B2

(12) United States Patent
Singh

(10) Patent No.: US 11,363,311 B2
(45) Date of Patent: Jun. 14, 2022

(54) VIDEO PRODUCTION SYSTEMS AND METHODS

(71) Applicant: SLING MEDIA PVT LTD, Bengaluru (IN)

(72) Inventor: Deepak Kumar Singh, Bengaluru (IN)

(73) Assignee: Sling Media Pvt. Ltd., Bangaluru (IN)

( * ) Notice: Subject to any disclaimer, the term of this patent is extended or adjusted under 35 U.S.C. 154(b) by 0 days.

(21) Appl. No.: 16/024,775

(22) Filed: Jun. 30, 2018

(65) Prior Publication Data
US 2019/0215539 A1     Jul. 11, 2019

(30) Foreign Application Priority Data

Jan. 10, 2018   (IN) .............................. 201841001038

(51) Int. Cl.
| | |
|---|---|
| *H04N 21/234* | (2011.01) |
| *H04N 21/236* | (2011.01) |
| *H04N 21/434* | (2011.01) |
| *H04N 21/2187* | (2011.01) |
| *H04N 19/597* | (2014.01) |
| *H04N 19/114* | (2014.01) |
| *H04N 21/2343* | (2011.01) |

(52) U.S. Cl.
CPC ....... *H04N 21/2187* (2013.01); *H04N 19/114* (2014.11); *H04N 19/597* (2014.11); *H04N 21/234* (2013.01); *H04N 21/236* (2013.01); *H04N 21/234336* (2013.01); *H04N 21/434* (2013.01)

(58) Field of Classification Search
None
See application file for complete search history.

(56) References Cited

U.S. PATENT DOCUMENTS

| | | | | |
|---|---|---|---|---|
| 6,738,356 | B1* | 5/2004 | Russell | H04N 5/265 348/14.08 |
| 2010/0302446 | A1* | 12/2010 | Mauchly | H04N 7/147 348/598 |
| 2011/0119716 | A1* | 5/2011 | Coleman, Sr. | H04N 7/181 725/62 |
| 2013/0222601 | A1* | 8/2013 | Engstrom | G11B 27/034 348/159 |
| 2014/0109144 | A1* | 4/2014 | Asnis | H04N 21/43615 725/48 |
| 2017/0223408 | A1* | 8/2017 | Asnis | H04N 21/43615 |
| 2017/0332131 | A1* | 11/2017 | Opsenica | H04W 72/1263 |

* cited by examiner

*Primary Examiner* — Shirley X Zhang
(74) *Attorney, Agent, or Firm* — KW Law, LLP

(57) ABSTRACT

Live video streams are produced using a network server system. The network server system initially receives, via a network, one or more captured video streams that are live streams captured from a remotely-located camera, phone or the like. The captured streams are forwarded to a control device via the network to thereby permit a user of the control device to select one of the captured video streams for output to the video production stream. In response to a command received from the control device that indicates the selected capture stream, the selected capture video streams is encoded for output as the video production stream.

14 Claims, 2 Drawing Sheets

VIDEO PRODUCTION SYSTEMS AND METHODS

PRIORITY CLAIM

Figure 1:
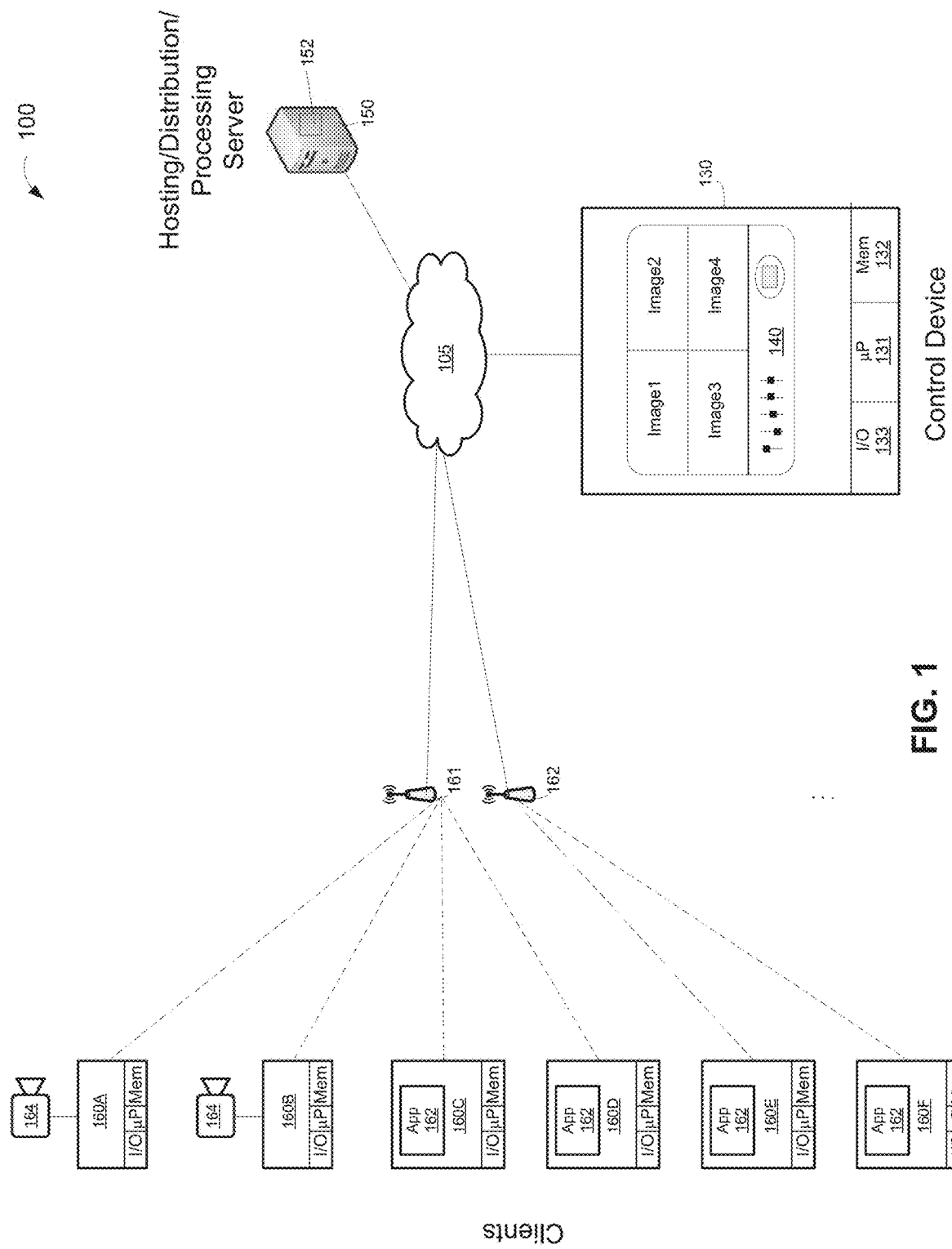

This application claims priority to India Provisional Application Serial No. 201841001038 filed on Jan. 10, 2018.

TECHNICAL FIELD

The following discussion generally relates to data communication, particularly wireless data communication. More particularly, the following subject matter relates to network-based video production systems.

BACKGROUND

Recent years have seen a dramatic increase in the use of mobile devices in conjunction with wireless networks, such as WiFi networks. At the same time, there has been a marked increase in the creation and enjoyment of digital video content. This is in part due to the fact that millions of people around the world now carry mobile phones, cameras or other devices that are capable of capturing high quality video and/or of playing back video streams in a convenient manner.

Conventional video production systems typically used a dedicated hardware device to perform on-site video encoding. One example of a video production system that uses a local encoder device is described in U.S. patent application Ser. No. 15/920,338, which is incorporated by reference herein as one example of a video encoding system. In that example, various "camera operators" capture live video content with a mobile phone or other camera that is streamed to a dedicated encoding device located on-site where the video is being captured. Typically, the encoder is located within range of a Wi-fi or similar wireless network to permit live streaming of captured video directly from the camera to the encoder. On-site encoding has the benefit of high bandwidth local streaming and dedicated encoding hardware. Several drawbacks can exist, however. The need to purchase and maintain dedicated encoding hardware may be prohibitive (or at least inconvenient) for some users, particularly those users who may have limited use for dedicated encoding hardware.

In some contexts in which a processing device—e.g., a video processing device adapted to receive video content from multiple mobile devices or "clients" over a wireless network via an access point—it is often the case that a number of other access points might be operating in the same area and receiving/transmitting packets within the same channel(s) as the processing device. The resulting competition over resources (i.e., between access points and the mobile devices themselves) can negatively affect the bandwidth available for data transmission between the individual mobile devices and the processing device, particularly in the case of the transmission of video and other high-bandwidth data.

It is therefore desirable to create systems and methods for dynamically producing video content from multiple client devices. Other desirable features and characteristics will become apparent from the subsequent detailed description and the appended claims, taken in conjunction with the accompanying drawings and this background section.

BRIEF DESCRIPTION OF THE DRAWING FIGURES

Example embodiments will hereinafter be described in conjunction with the following drawing figures, wherein like numerals denote like elements, and:

FIG. 1 is a diagram of an example system for encoding, producing and distributing live video content in accordance with one embodiment.

Figure 2:
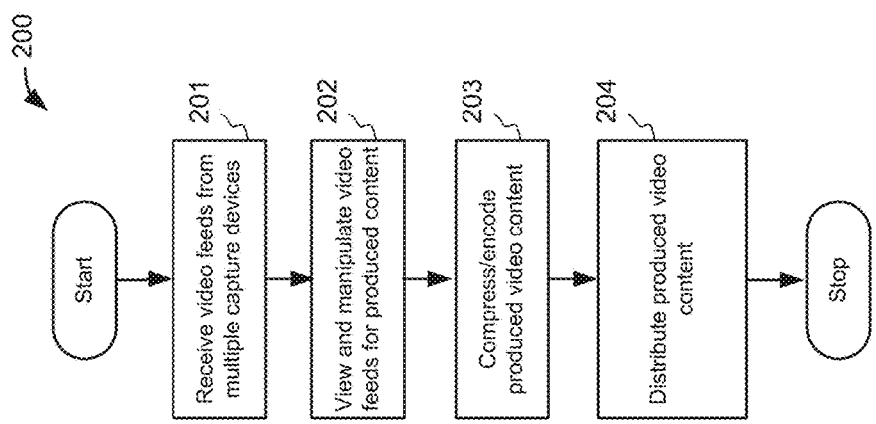

FIG. 2 presents a flowchart illustrating a method in accordance with one embodiment.

BRIEF DESCRIPTION

Various embodiments replace or supplement on-site video encoding during live video production with network-based or similarly remote processing performed by a network server, cloud service and/or the like.

In an example embodiment, an automated process executed by a data processing system to create video production stream. The automated process suitably comprises: receiving, via a network, a plurality of captured video streams, wherein each of the captured video stream is a live stream received via a network from one of a plurality of remotely-operated capture devices; forwarding each of the captured video streams to a control device via the network to thereby permit a user of the control device to select one of the captured video streams for output to the video production stream; and, in response to a command received from the control device, encoding the selected one of the captured video streams for output to the video production stream.

Other embodiments relate to network server systems and devices, control devices, video capture devices and/or automated processes performed by any of such systems or devices. These and other embodiments are described below.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

The systems and methods described herein may be used in a variety of contexts. Without loss of generality, the various systems and methods are often described in the context of a video production system in which one or more live video streams are received via a wireless network to produce an output video stream for publication or other sharing. The embodiments are not so limited, however. Any network in which multiple client devices are connected to a common access point may utilize the disclosed methods and systems.

According to various embodiments, on-site encoding hardware is replaced and/or supplemented with cloud-type encoding resources that are available via the Internet or another wide area network (WAN). The reduction (or elimination) of on-site hardware allows for more widespread adoption by different types of customers, including more casual users who may not have the desire or resources to purchase dedicated hardware. To that end, network processing resources available from a dedicated server and/or shared cloud processing (e.g., Amazon Web Services (AWS), Microsoft Azure services and/or the like).

FIG. 1 illustrates an example of a video production system (or simply "system") 100 that might be used to produce a video program based upon selected inputs from multiple input video feeds. In the illustrated example, system 100 includes a video processing module 152 (incorporated via appropriate software and/or hardware within a server 150 or the like) that selects and encodes video content based on instructions received from a control device 130 via network 105. The encoded video program may be initially stored as a file within an external storage device (e.g., a memory card, hard drive or other non-volatile storage) for eventual uploading to a hosting, distribution, and/or processing server 150 operating on the Internet or another network 105. In some embodiments, the encoded video program is directly streamed or otherwise transmitted to a social media platform or video hosting service for viewing by the public, friends, or some other selected subset of individuals.

Processing module 152 includes suitable processing hardware such as a microprocessor, a memory, and input/output interfaces (including, for example, a suitable USB or other interface to the external storage). Processing module 152 includes logic (implemented as hardware and/or software) for communicating with any number of clients 160, illustrated as an array of video capture devices 160A-F connected to network 105 via one or more access points (such as IEEE 802.11 APs 161 and 162).

Clients 160 are any devices capable of capturing live video content and providing a stream of the captured content to server 150 via the Internet or another wide area network (WAN) 105. Clients 160 may include mobile phones, tablets, laptops or similar devices executing a video capture application 162, as desired. Clients 160 might also include one or more conventional video cameras 164 that interact with processing module 152 via an interface device that receives DVI or other video inputs and transmits the received video to the processing module 152 via a Wi-fi, Bluetooth or other wireless network, as appropriate. Other embodiments could facilitate communications with any other types of video capture devices in any other manner.

Processing module 152 may be implemented as a control application executing on a processor within server 150, for example, that includes logic for implementing the various processes described herein. As noted above, server 150 may be implemented with conventional computing hardware, including any number of processors, data storage, data interfaces and the like. In some embodiments, server 150 is implemented within the context of a web service system that includes conventional load balancing, firewalls, user authentication, network administration and control and the like. Equivalently, server 150 may be implemented using any so-called "cloud" service that abstracts the actual hardware performing the various functions, such as the AWS service available from Amazon.com, the Azure service available from Microsoft Corp., or any other service as desired.

Other embodiments may implement the various functions and features using hardware, software and/or firmware logic executing on other components, as desired. An encoder 116, for example, may be implemented using a dedicated video encoder chip in some embodiments.

In various embodiments, processing module 152 operates in response to user inputs supplied by an operator of a control device 130. Control device 130 may correspond to any type of computing device that includes a processor 131, memory 132 and input/output feature 133. In various embodiments, control device 130 is as a tablet, laptop or other computer system, for example, or a mobile phone or other computing device that executes a software application 140 for controlling the functions of system 100.

The example illustrated in FIG. 1 depicts control application 140 having an interface that shows various video feeds received from image collection devices 160A-F and lets the user select an appropriate feed to encode into the finished product. Application 140 may include other displays to control other behaviors or features of system 100, as desired. Typically, control device 130 interacts with processing module 152 via network 105. Control device 130 may access the network 105 via a mobile telephone or other wireless network, although wired connections could be equivalently used.

In operation, referring now to FIG. 2, video feeds are received by module 152 at server 150 from one or more capture devices 160 (step 201). Some or all of the video feeds received from the capture devices 160 are then provided by server 150 to control device 130 via network 105. Video streams supplied from server 150 to control device 130 may be substantially compressed to preserve bandwidth and reduce latency. In various embodiments, the various capture feeds are combined into a single output stream encoded by server 150 so that only one stream needs to be provided to the control device 130. In further embodiments, the stream is compressed to the point of still imagery (e.g., i-frames) that are sent on any regular or irregular temporal basis so that the control device 130 simply receives frequent "snapshots" of the various capture feeds rather than full motion video. The imagery may be further compressed or combined with other captured imagery or video as desired.

Typically, a user acting as a video producer uses application 140 executing on control device 130 to view the various capture feeds that are available, and to select one of the feeds for an output stream as desired. Application 140 notifies server 150 of the selected feed, and server 150 suitably processes and/or otherwise manipulates the various video feeds that are available from one or more capture devices 160A-F as appropriate (step 202).

As noted above, the selected video feed is selected as one of the feeds received from the clients 160. The video processing module 152 suitably compresses or otherwise encodes the selected video in an appropriate format for eventual viewing or distribution (steps 203-204). Video encoding by module 152 occurs according to any standard, non-standard or other protocol, such as MPEG4. Updated captured video feeds are provided to the control device as appropriate so that the producer can select different feeds as needed to create a desired output stream. Different capture devices located at different vantage points, for example, may be selected at different times to provide desired views of the event being captured.

At any location, it is possible that there are multiple APs operating in the same or different Wi-Fi channels (such as APs 161 and 162). APs that operate on different channel numbers will not interfere with each other, while APs that operate on the same channel will interfere with each other and result in reduction of bandwidth/throughput. If two or more APs are operating via the same channel number, then all the APs share the available WiFi medium in a "half-duplex" manner. For example, if AP 115 and AP 161 operate via channel 155, then at any point either of the APs can send data, but not simultaneously.

Various embodiments therefore allow remote processing capabilities to supplement or replace on-site encoding during live video production. Feeds captured from phones, cameras or the like can be sent to a network server for initial processing (e.g., compression, sampling or decimation)

before being sent to a control device for review by a video producer. The producer selects one of the captured feeds to be used in an output stream, and the control device notifies the network server of the selected stream. The network server responsively encodes the selected stream in an appropriate output format for distribution, storage or the like. Various embodiments are therefore able to perform real-time video production using live-captured imagery from one or more cameras. "Real-time" in this context is intended to recognize that some delay is inherent in data transmission and processing.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executed by a data processing system accessible via a network to create a video production stream, the automated process comprising:
   receiving, via the network, a plurality of captured video streams, wherein each captured video stream is a live stream of an event occurring at a location, and wherein each captured video stream is received by the data processing system via a network from one of a plurality of remotely-operated capture devices located at the location of the event;
   combining, by the data processing system, the video imagery from each of the captured video streams received from the plurality of capture devices located at the location of the event to create a single combined stream that includes video imagery from each of the captured video streams;
   forwarding the single combined stream that includes the imagery from each of the captured video streams from the data processing system via the network as an input stream provided to a control device located remotely from the data processing system to thereby permit a user of the control device to view each of the captured video streams within the input stream and to select one of the captured video streams present in the single combined stream; and
   in response to a command received via the network from the control device that identifies the selected one of the captured video streams from the single combined stream, the data processing system selecting the selected one of the captured video streams from the captured video streams received from the plurality of remotely-operated capture devices and providing only the selected one of the captured video streams for output to the video production stream.

2. The automated process of claim 1 wherein the data processing system is a cloud-based video processing system operating on hardware that is not located at the location of the event, and wherein each of the captured video streams are captured and received by the data processing system in real time.

3. The automated process of claim 2 wherein the forwarding is performed in real time.

4. The automated process of claim 3 wherein the encoding is performed in real time to create the video production stream as a live stream from the captured video streams received from the plurality of remotely-operated capture devices at the location of the event.

5. The automated process of claim 1 wherein at least some of the capture devices are mobile telephones, and wherein the control device is a tablet computer.

6. The automated process of claim 1 wherein the data processing system is a computer server comprising a processor, memory and interface to the network, wherein the processor is configured to execute instructions stored in the memory to perform the receiving, forwarding and encoding.

7. The automated process of claim 1 wherein the data processing system is implemented within a cloud processing server system.

8. The automated process of claim 1 further comprising the data processing system compressing the captured video streams prior to forwarding the single combined stream to the control device located at the location of the event.

9. The automated process of claim 8 wherein imagery provided in the single combined stream forwarded to the control device comprises a series of still images from each of the captured video streams.

10. The automated process of claim 9 wherein the still images are selected from the i-frames of the captured video streams.

11. The automated process of claim 1 further comprising the data processing system compressing the captured video streams received from the plurality of remotely-operated capture devices located at the remote location.

12. A data processing system to create a video production stream of an event occurring at a location, the data processing system comprising a processor, a memory and an interface to a network, wherein the memory comprises computer-executable instructions that, when executed by the processor, cause the data processing system to execute an automated process comprising:
   receiving, via a network, a plurality of captured video streams, wherein each of the captured video stream is a live stream of an event occurring at a location of the event, wherein each captured video stream is received by the data processing system via a network from one of a plurality of remotely-operated capture devices located at the location of the event;
   combining, by the data processing system, the video imagery from each of the captured video streams received from the plurality of capture devices located at the location of the event to create a single combined stream that includes video imagery from each of the captured video streams;
   forwarding the single combined stream that includes the imagery from each of the captured video streams from the data processing system via the network as an input stream to a control device located remotely from the data processing system to thereby permit a user of the control device to view each of the captured video streams as part of the single combined stream and to select one of the captured video streams from the single combined stream for output to the video production stream; and
   in response to a command received from the control device that identifies the selected one of the captured video streams from the single combined stream, the data processing system selecting the selected one of the captured video streams from the captured video streams received from the plurality of remotely-operated capture devices and providing only the selected one of the captured video streams for output to the video production stream.

13. The data processing system of claim 12 wherein the data processing system is a cloud-based video processing system operating on hardware that is not located at the location of the event, and wherein each of the captured video streams are captured and received by the data processing system in real time.

14. The data processing system of claim 12 wherein the automated process further comprises the data processing system compressing the captured video streams received from the plurality of remotely-operated capture devices located at the location of the event.

\* \* \* \* \*